Figures 1, 2:
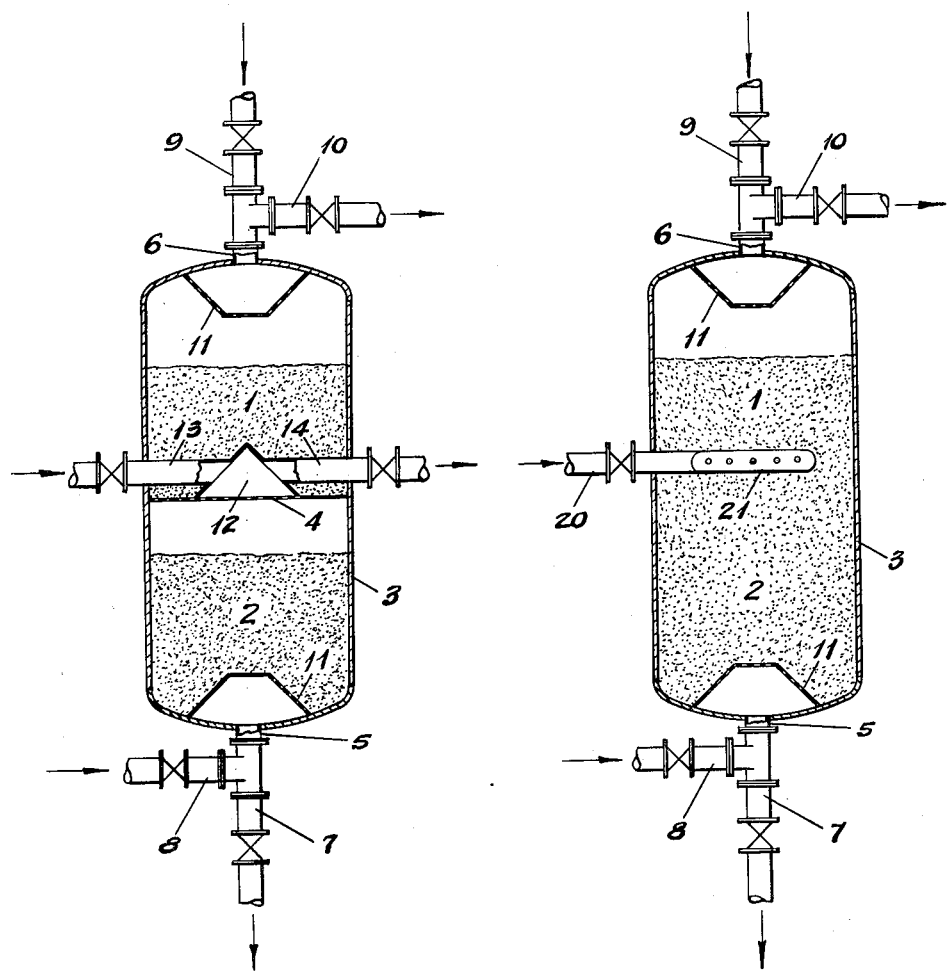

Jan. 16, 1962   A. J. P. KRATZ   3,017,347
PROCESS OF PURIFYING WATER WITH ACTIVATED CARBON
Filed July 27, 1959

3,017,347
PROCESS OF PURIFYING WATER WITH ACTIVATED CARBON

Alfred J. P. Kratz, Frankfurt am Main, Germany, assignor to Metallgesellschaft Aktiengesellschaft, Frankfurt am Main, Germany
Filed July 27, 1959, Ser. No. 829,636
Claims priority, application Germany, July 31, 1958
5 Claims. (Cl. 210—63)

This invention relates to a process for the purification of clear water containing dissolved heavy metal compounds and substances causing taste and odor.

It is an object of the invention to provide an improved process for the removal of dissolved heavy metal compounds and taste and odor causing substances from clear water.

Another object is to provide a process for the simultaneous catalytic separation of dissolved heavy metal compounds and adsorption of taste and odor causing substances which permits an improved utilization of the treating material used in the process.

Another object is to provide a process of this general type which is economical in operation.

Other objects of the invention will become apparent upon consideration of the following detailed description and of the claims.

In many cases it is necessary, in order to provide drinking water for the population, to use surface water, such as river water, which has been clarified and cleaned, for example by soil filtration or by other means, so far that it is perfectly clear and free of turbidity. However, such waters frequently contain heavy metal compounds, e.g. of iron and manganese, in dissolved form as well as taste and odor forming matter, mostly of organic nature, which make their use as drinking water impossible without previous suitable treatment.

By combining an oxidizing treatment with activated carbon, the heavy metal compounds as well as taste and odor can be removed to such a degree that an objectionable drinking water is obtained. The process is characterized by passing the water which has been dosed with suitable quantities of oxidizing agents, such as ozone, chlorine, chlorine dioxide or the like over granular activated carbon. The heavy metal compounds which are oxidized by the oxidizing means but remain in the dissolved state are catalytically deposited on the active surface of the carbon. Simultaneously the taste and odor causing substances are adsorbed by the active carbon. Thus a proper purification of the water is obtained.

It has been discovered unexpectedly that under the above described conditions, i.e. that after addition of the oxidizing means the heavy metal compounds remain in solution and the water remains clear, the efficiency of the active carbon can be considerably increased for these different purposes and its life prolonged by using the active carbon in a relatively deep bed of 2 m. (meter) or more and subdividing the bed so that the upper and the lower portions can be separately washed. It has been found that the oxidized dissolved heavy metal compounds deposit predominantly in the upper layers of the active carbon and that these compounds can be largely removed from this layer by timely backwashing. This prevents their penetrating into the lower layers of the active carbon which thereby remain active for adsorption of the taste and odor causing substances which require generally a deeper active carbon bed.

In practicing the invention granular active carbon of ½–2 mm. (millimeter) size is used. The bed usually is divided so that the upper portion, which serves for the removal of the heavy metal compounds, is shallower than the lower portion, so that for example a proportion of 1:2 results. It may be advantageous to use for the upper layer active carbon of different grain size than for the lower layer. For the upper layer it is preferable to select active carbon of relatively high strength and/or specifically good separating capacity for the dissolved heavy metal compounds.

In the drawings two apparatus for carrying out the process of the invention are shown diagrammatically for purposes of illustration. Similar numbers in the two figures designate similar elements.

FIGURE 1 shows in vertical section an activated carbon filter for utilization of two different active carbons; and FIGURE 2 shows a similar view of an activated carbon filter for use of one kind of activated carbon.

In the embodiment of FIGURE 1 two beds of active carbon 1 and 2 are provided. The tank 3 is divided by means of a liquid pervious partition 4, upon which the upper filter bed rests (if required with an intermediate layer, as known in the art), in such manner that the beds are in the proportion of 1:2. Conduits 5 and 6 lead from the bottom and top, respectively, of the container and are connected to valved conduits 7 and 8, and 9 and 10, respectively. The openings of the conduits 5 and 6 within the tank are covered by screen baskets 11 or the like to prevent active carbon from being carried out.

Immediately above the partition 4 is a conical open bottom liquid distributor 12 which is connected to valved conduits 13 and 14, which extend to outside the tank.

In operation the water to be treated may be introduced through conduit 9 and be passed downwardly through the tank 3.

When the upper carbon bed 1 is to be washed, the valves on conduits 7, 8, 9, and 14 are closed. The clear water for washing the upper bed is introduced through conduit 13 into the distributor 12 and flows therefrom through the partition 4 and upwardly through the carbon bed 1, whereby the heavy metal compounds which have been catalytically deposited therein are washed out. The turbid water leaves the tank through conduit 10.

The lower filter bed 2 usually requires backwashing for cleaning or reforming less frequently than the upper bed; however, it is advantageous to backwash it from time to time. During washing of bed 2 the valves on conduits 7 and 13 are closed and clear water is introduced through conduit 8 at a velocity which loosens the bed and washes out any particles of dirt or precipitate which have penetrated into the lower bed. The wash water is withdrawn from the tank through the distributor 12 and conduit 14.

It is also possible to wash the upper bed simultaneously with the lower bed. In this case the wash water is introduced through conduit 8 and withdrawn through conduit 10, while all other conduits are closed.

FIGURE 2 shows a simplified embodiment of the apparatus according to FIGURE 1. In this embodiment provision is made only for washing the upper bed alone or both beds together. The partition is omitted and the wash water for washing of the upper bed is introduced through a conduit 20, which discharges within the container, for example by means of a sparger ring 21. This ring may be embedded for example in the upper half of the entire body of activated carbon.

Operation of this filter is the same as described in connection with FIGURE 1.

In the embodiment of FIGURE 2 ordinarily the same activated carbon will be used in both beds, whereas, as pointed out above, in an apparatus according to FIGURE 1, different kinds of carbon can be used.

*Example*

For the simultaneous catalytic separation of heavy metal compounds and adsorptive purification of the water pretreated with oxidizing agents according to the invention, it is advantageous to use deep filter beds. For example the total depth of the activated carbon is 3 m. and the separately washable upper third of the bed is washed for example after 48 hours of operation. A suitable wash velocity is chosen, for example 25 m./h. (meter per hour) so that the heavy metal compounds deposited on the active carbon are washed out of the filter bed as far as possible.

The effectiveness of the active carbon for the precipitation of dissolved heavy metal compounds depends among other things on its grain size. Frequently a grain size of 0.5–2 mm. is particularly suitable.

Since the separation effect of the carbon bed for the heavy metal compounds is exhausted more or less quickly, depending on the quantity of such materials contained in the water to be treated, and the adsorptive power of the carbon bed for the taste and odor causing substances generally decreases much slower, the process of the invention permits to utilize the carbon to the complete exhaustion of its adsorptive power. The adsorptive capacity of the upper layer is more quickly exhausted due to its serving for the separation of heavy metal compounds. However, by means of backwashing, the upper layer retains its catalytic effectiveness for precipitation of heavy metal compounds and thus remains usable for this task over long periods of time. The lower layer, which receives water low in heavy metal compounds, generally is only gradually exhausted by the adsorption of dissolved taste and odor causing substances. Since this adsorptive load of the active carbon ordinarily cannot be removed in economical manner, for example by means of backwashing or other regeneration measures, the exhausted carbon preferably is replaced by fresh carbon. between said disks.

I claim:
1. In a process of purifying water containing dissolved heavy metal compounds and taste and odor imparting substances, wherein the water to be purified is dosed with an oxidizing agent and then contacted with a bed of activated carbon to precipitate the oxidized heavy metal compounds and remove taste and odor imparting substances, the improvement comprising passing the water dosed with oxidizing agents downwardly through a bed of granular activated carbon sufficiently deep to substantially complete the catalytic precipitation and deposition of dissolved heavy metal compounds oxidized but not precipitated by said oxidizing agents on the carbon in the upper portion of said bed and to maintain the carbon in the lower portion of said bed free of precipitated heavy metal compounds and available for adsorbing taste and odor imparting substances, backwashing said upper portion when its catalytic capacity is exhausted to prevent penetration of precipitated heavy metal compounds into said lower portion, then continuing flow of water to be purified through both portions of the bed, and repeating the alternate backwashing of said upper portion and passing of water to be purified through the entire bed until the adsorptive capacity of said lower portion of the carbon bed is exhausted.

2. The process of claim 1, wherein said lower portion is also backwashed before its adsorptive capacity is exhausted, but less frequently than said upper portion.

3. The process of claim 2, wherein said lower portion is backwashed separately from said upper portion.

4. The process of claim 1, wherein the ratio of said upper portion to said lower portion is 1 to 2.

5. The process of claim 1, wherein different types of carbon are used to effect catalytic deposition of heavy metal compounds and adsorption of taste and odor imparting substances, respectively.

References Cited in the file of this patent
UNITED STATES PATENTS

| | | |
|---|---|---|
| 636,447 | Paddock | Nov. 7, 1899 |
| 654,479 | McNally | July 24, 1900 |
| 1,750,561 | Adler | Mar. 11, 1930 |

UNITED STATES PATENT OFFICE
CERTIFICATE OF CORRECTION

Patent No. 3,017,347 January 16, 1962

Alfred J. P. Kratz

It is hereby certified that error appears in the above numbered patent requiring correction and that the said Letters Patent should read as corrected below.

Column 1, lines 40 and 41, for "objectionable" read -- unobjectionable --; column 3, line 36, strike out "between said disks.".

Signed and sealed this 8th day of May 1962.

(SEAL)
Attest:

ERNEST W. SWIDER
Attesting Officer

DAVID L. LADD
Commissioner of Patents